J. RIDER.
Seed Planter.

No. 2,002.

Patented Mar. 12, 1841.

Witnesses:

Wm Mudge
E. B. Goddard

Inventor:

Justis Rider

UNITED STATES PATENT OFFICE.

JUSTUS RIDER, OF WOODBURN, ILLINOIS, ASSIGNOR TO WILLIAM H. RIDER.

IMPROVEMENT IN AGRICULTURAL INSTRUMENTS, CONSISTING OF A PLOW COMBINED WITH A CULTIVATOR AND PLANTER FOR PLOWING, &c., AT ONE OPERATION.

Specification forming part of Letters Patent No. 2,002, dated March 12, 1841.

*To all whom it may concern:*

Be it known that I, JUSTUS RIDER, of Woodburn, Macoupin county, State of Illinois, have invented a new and useful Machine for Plowing and Planting; and I do hereby declare that the following is a clear description of the construction and operation of the same, reference being had to the drawings accompanying this description and making part of this specification, in which—

Figure 1:
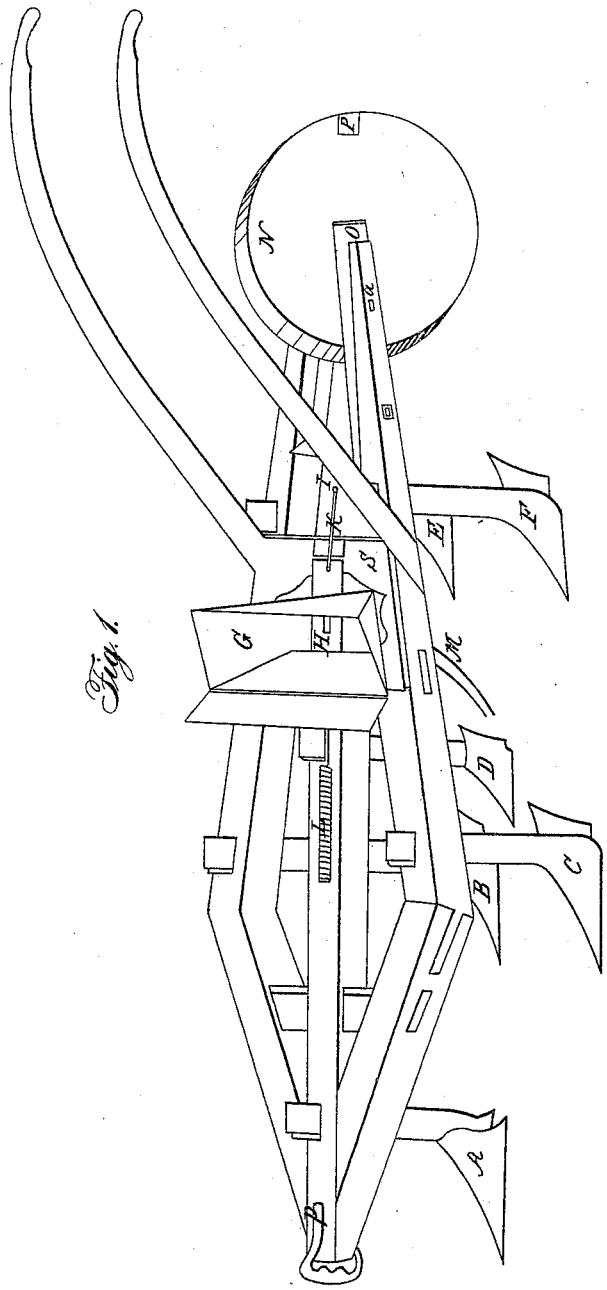
Figure 2:
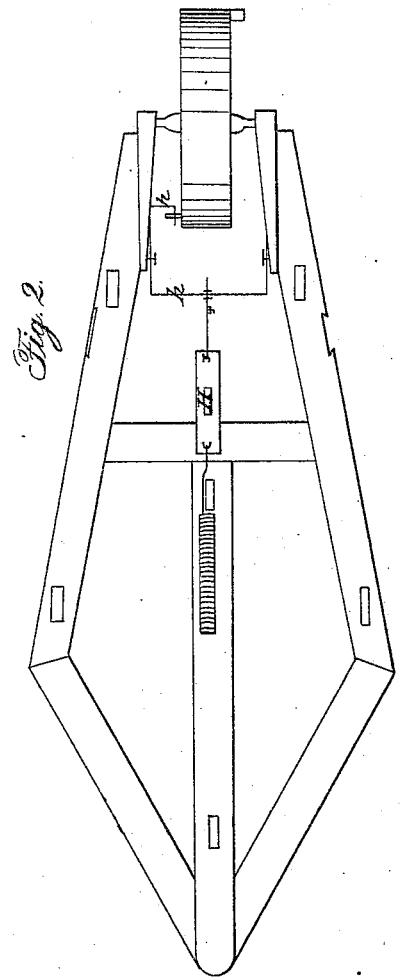

Figure 1 is a perspective view, and Fig. 2 a ground view.

The shape or size of this plow and planter may be varied as circumstances require; but for preparing the ground without previous plowing, I think the size should be about as follows: The frame is made of oak, ash, or any other good timber three by four inches square, the fore part of which is put together somewhat in the shape of a triangle with a timber running back three feet through the center. The two sides of the triangle are two feet in length, and chamfered to fit the middle timber at the forward end, and secured with an iron bolt, which will bring the two extremities of the side pieces two feet and four inches apart. A sheth or timber one inch thick and four inches wide passes through the middle timber sixteen inches from the forward end, and is mortised into the side pieces and secured by a pin. I then attach by a mortise and tenon to the extremities of the triangle timbers three feet four inches long, running back on an angle, that the extremities at the back end will be sixteen inches from outside to outside, and chamfered on the inside ten inches from the back end, so as to be parallel with the line drawn through the center of the machine. Three feet from the forward end is a cross-timber mortised into the sides and secures the end of the middle timber by a tenon.

The first plow, A, (see drawings,) is a double plow, which cuts seven inches, without mold-boards, and lets the dirt fall back into the furrow. It is attached to a colter or bar of iron three-fourths by two inches, which passes through a mortise three-fourths by three inches one foot from the front end in the middle timber and secured by a key or wedge.

The second and third plows, B and C, are shaped like common right and left hand plows with mold-boards, and cut seven inches, are attached to colters the same size as the first, and pass through the side pieces the same as the first, two feet four inches from the front end, and so as to be two feet from outside to outside of the plows, which will place them about two and one-half or three inches behind the pieces forming the triangle. Turning thin furrows in forms a ridge on the furrow made by plow A, which is ready to receive the seed. Thus the three plows described and marked in drawing A B C do the work of preparing the ground, and to distinguish them I denominate them the "workers."

Two feet from the worker A in the middle timber is a double plow marked D, which cuts three inches, with mold-boards attached to a colter or bar one-half inch by one and one-half inch, and passes through a mortise and secured the same as the workers, which is designed to open a drill for the seed. Back of the bar of this plow and even with the front side of the cross-beam is a board three-fourths inch thick and about one foot wide, fastened to the top of the frame by screws or nails, across the center of which is a square groove two inches wide and one-half inch deep. In the center of the groove is a three-fourth-inch hole, into which the tube marked M is fastened for conducting the seed to the heel of plow D. A slide is made to fill the groove, in the center of which is an oblong square hole or mortise, H. The forward end is attached to a spiral spring, L. At or near the back end is a staple to receive a hook. A wire with a hook at each end about six inches long is hooked to the staple. The other end is hooked into the eye of a screw about four inches long. This screw passes through a hole or an eye in a horizontal wire that is attached to two upright wires about two and one-half or three inches high, and works on a pivot on the two side pieces, about ten inches from the hind end, and attached to the wire at the pivot. On the right-hand side is a wire or lever that runs back of the edge or rim of the wheel about three inches, and is bent at right angles, so as to come within one-half inch of the side of the wheel (drawing 2, *h.*) The wheel is to be sixteen inches in diameter. The axle or gudgeon works in the pieces which I call "gudgeon-blocks," one foot long, two inches square at the back end, and chamfered inside to one inch, and work on the same pivot with the dropping-wire, and is designed to raise and fall the wheel at pleasure to govern in some degree the depth that is required to plow.

In the side of the rim of the wheel is a pin which strikes the wire or lever and draws the slide H, through which the seed falls to the earth. Pins may be put in at any given distance on the wheel, so that seed may be dropped at any required distances. On the opposite side of the wheel is a piece of wood or iron, 3, that comes even with the outside of the rim at such distance from the pin that it will strike the ground on the spot where the seed was deposited, that the operator may know when he is or is not making rows both ways and set the wheel accordingly, the unevenness of the ground having a tendency to alter the distance on an airline.

The hopper may be made of any size, but I think should be small at the bottom to bring the seed nearer the place for passing out, and covered to prevent accident, should be fastened to the board S, the bottom of the back side should be placed about over the center of the tube, which will enable the operator to see the seed as it drops into the tube, and thereby prevent any stoppage that might occur. When a large quantity of seed is to be dropped, take up the wire by means of the screw at the end of the wire, which is attached to the slide; if less, let it out, whereby there is not so much action to the slide. In this way the slide may be governed so as to give the quantity required.

About ten inches from the back end are two plows, right and left, which cut three inches, with mold-boards, and one foot four inches from outside to outside, and designed to pulverize the dirt and cover the seed. They are attached to bars the same as B and C. The work being then done, the wheel passes over it, so as to press the dirt on the seed and impress over the seed.

The handles are similar to common plow-handles and put on with a dovetail, and bolted at such a distance from the end as to enable the operator to walk without inconvenience behind the wheel. A common notched clevis being put on, it is ready for operation.

What I claim as my invention, and desire to secure by Letters Patent, is—

The combination of a cultivator or of plows for the preparing of the soil to receive the seed, consisting of an opening-share with two coverers behind it, with a seed-drill having an opener in front with two coverers behind, the seed being deposited at the back of the opener, the arrangement of the shares constituting the cultivator preceding those of the seed-drill, as set forth.

JUSTUS RIDER.

Witnesses:
WM. MIRELY,
E. B. GODDARD.